(12) United States Patent
Herren

(10) Patent No.: US 9,454,784 B2
(45) Date of Patent: Sep. 27, 2016

(54) MULTIPLATFORM INTERFACE

(71) Applicant: Todd D. Herren, Waukee, IA (US)

(72) Inventor: Todd D. Herren, Waukee, IA (US)

(73) Assignee: The Members Group, LLC, Des Moines, IA (US)

( * ) Notice: Subject to any disclaimer, the term of this patent is extended or adjusted under 35 U.S.C. 154(b) by 398 days.

(21) Appl. No.: 14/102,034

(22) Filed: Dec. 10, 2013

(65) Prior Publication Data

US 2015/0160908 A1  Jun. 11, 2015

(51) Int. Cl.
*G06Q 40/02* (2012.01)
(52) U.S. Cl.
CPC ..................... *G06Q 40/02* (2013.01)
(58) Field of Classification Search
CPC ............. G06Q 40/02; G06Q 20/108
See application file for complete search history.

(56) References Cited

U.S. PATENT DOCUMENTS

| | | | | |
|---|---|---|---|---|
| 6,097,834 A * | 8/2000 | Krouse | ............. | G06Q 20/04 382/137 |
| 8,170,932 B1 * | 5/2012 | Krakowiecki | ....... | G06Q 40/025 705/30 |
| 2002/0091635 A1 * | 7/2002 | Dilip | ............. | G06Q 20/10 705/39 |
| 2003/0177091 A1 * | 9/2003 | Paglin | ............. | G06Q 40/02 705/42 |
| 2006/0085759 A1 * | 4/2006 | Knapheide | ............. | G06F 3/0482 715/777 |
| 2007/0226139 A1 * | 9/2007 | Crumbach | ............. | G06Q 20/102 705/40 |
| 2008/0015982 A1 * | 1/2008 | Sokolic | ............. | G06Q 20/10 705/39 |
| 2009/0032579 A1 * | 2/2009 | Gardner | ............. | G06Q 20/042 235/379 |
| 2010/0153977 A1 * | 6/2010 | Valentin | ............. | G06F 8/34 719/328 |
| 2010/0205093 A1 * | 8/2010 | Seale, III | ............. | G06Q 20/10 705/40 |
| 2012/0209775 A1 | 8/2012 | Milne | | |

* cited by examiner

*Primary Examiner* — Tom Sheng
(74) *Attorney, Agent, or Firm* — Brett J. Trout

(57) ABSTRACT

Methods, systems, and apparatuses, including computer programs encoded on a computer storage medium, for displaying interfaces associated with various financial system platforms accessed through a central location. The system may retrieve financial information directly and replicate a financial system interface and platform for a user. The system may display preferred access platforms and interfaces and may frame existing platforms and interfaces with additional data and functionality.

20 Claims, 7 Drawing Sheets

MULTIPLATFORM INTERFACE

BACKGROUND OF THE INVENTION

This invention relates generally to a system and method for rendering multiple financial system interfaces through a single platform.

Providing web-based platforms for the management of credit, debit, ATM, and prepaid cards is not new in the art. While there are platforms for allowing online management of financial transactions, many involve the use of an interface to prompt the user for requested information and to display information requested by the user. As online interfaces are associated with management of various financial accounts, each financial institution is typically associated with a unique online interface, offering unique levels of service and amenities. Most online interfaces for the management of financial accounts are customized to the financial institution associated with the financial account.

Providing a customized financial account interface allows the user to become familiar with the interface, allows for the provision of unique services offered by the financial institution, and eliminates other services or amenities not offered through the financial institution. Customized interfaces provide advantages for the end user and the financial institution, but pose a drawback for employees of third party financial service providers seeking access to account information through centralized systems. While an employee of a third party financial service provider may go directly to the online presence of a specific financial institution associated with the information needed, this would require the employee to determine the financial institution and the associated web uniform resource locator (URL) associated with the financial institution.

It would therefore be desirable to provide a single platform that allows an employee of a third-party financial service provider to input a piece of financial account information, such as a customer's account number or a bank identification number, into a central interface. It would be desirable that the central interface would have a computer program that would receive the account information, determine the associated financial institution, and display either the interface for the financial institution or a similar, simulated interface. The interface would preferably allow the employee to interact with the interface in a manner similar to the manner in which the employee would interact with the actual interface associated with the financial institution. The drawbacks associated with prior art financial institution website interfaces known in the art are substantially overcome by the present invention.

SUMMARY OF THE DISCLOSED SUBJECT MATTER

Methods, systems and computer program products for rendering multiple financial system interfaces on a single platform are disclosed herein.

According to an exemplary embodiment, a method for allowing multiple users, using multiple account platforms and multiple interfaces, access to multiple financial accounts is disclosed. A multi-platform interface is used to access multiple financial accounts associated with financial institutions. A non-transitory computer readable program code encoded in a computer readable medium receives a first account factor associated with a first financial account. The program code accesses the first account platform and retrieves a first set of information associated with the first financial account. The program code displays on an interface similar to the interface associated with the first financial institution. The program code receives a second account factor associated with a second account platform and uses the second account factor to access the second account platform and retrieve a second set of information associated with the second financial account. The program code then displays a fourth interface associated with and similar to the second financial institution displaying the second set of information associated with the second financial account.

BRIEF DESCRIPTION OF THE DRAWINGS

Embodiments are described with reference to the accompanying drawings. In the drawings, like reference numbers may indicate identical or functionally similar elements.

DETAILED DESCRIPTION OF THE DRAWINGS

Disclosed herein is a system for allowing multiple users, using multiple account platforms and multiple interfaces, to access information associated with multiple financial accounts. There are many reasons why it may be beneficial to access information from multiple financial accounts associated with multiple financial institutions from a single interface. When accessing account information from a single access interface, it may be beneficial to present information retrieved thereby in a format familiar with the entity requesting the information. By presenting the information in an interface that is an imitation of the interface associated with direct access to the financial institution, it allows an entity familiar with the financial institution's platform interface to interact more readily and more efficiently with the interface.

Figure 1:
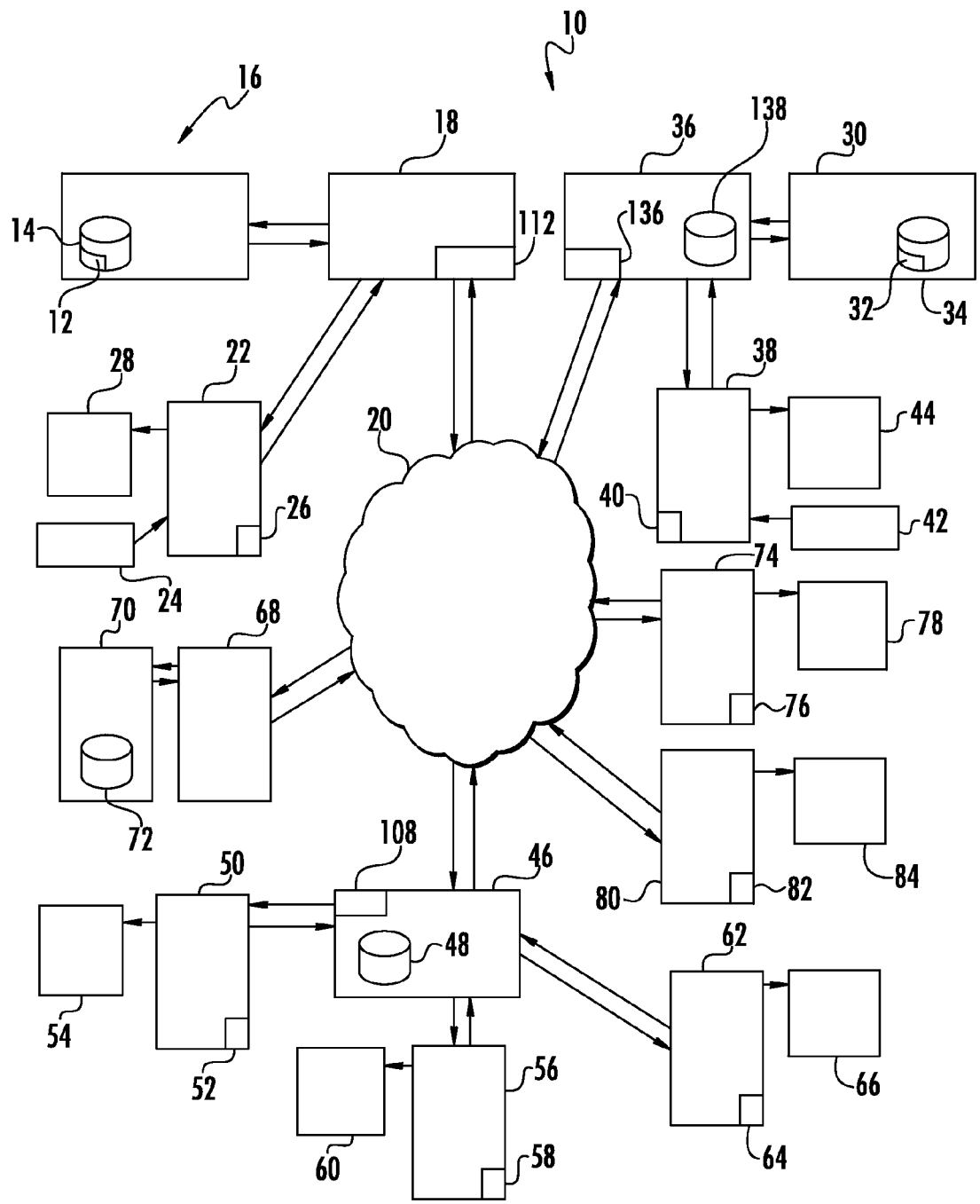
FIG. 1 is a block diagram of a multi-platform financial system interface according to an exemplary embodiment.

As shown in FIG. 1, a multiplatform financial system interface 100 is provided to allow a user to access data 12 stored in a database 14 of a financial institution 16. The financial institution 16 is coupled to a server 18, which in turn is coupled to a network 20. Data may be input into the database 14 with a computing device, such as a client device 22, having an input device such as a keyboard 24. The client device 22 may be of any type known in the art, including, but not limited to, a desktop, workstation, notebook, net book, net tablet, mainframe, terminal, or any device having the capability of communicating over a network. In this embodiment, the client device 22 is provided with network access applications known in the art, such as a browser 26, to facilitate communication over the network 20. The network 20 may be of any type known in the art, including, but not limited to, the Internet, a local area network (LAN), a wide-area network (WAN), telephony, or any combination thereof. The client device 22 is provided and configured to execute computer-executable instructions that cause the browser 26 to appear on a display 28 and perform the method detailed more fully below.

As shown in FIG. 1, a second financial institution 30 is provided with data 32 contained within a database 34 coupled via a server 36 having a browser 40, a keyboard 42, and display 44. In this embodiment, a server 46 provided with a database 48 is coupled to the network 20. A third client device 50 having a browser 52 and a display 54, a fourth client device 56 having a browser 58 and a display 60, and a fifth client device 62 having a browser 64 and a display 66, are coupled to the server 46. A third financial institution 70 having a database 72 and coupled to a server 68, a sixth client device 74 having a browser 76 and a display 78, and an seventh client device 80 having a browser 82 and a display 84, are coupled to the network 20.

A user uses a client device 56 to input a unique user name and password, which the client device 56 sends to the server 46. The server 46 receives the user name and password and causes the client device 56 to present an interface 92 to the user on the display 60. The server 46 is designed with role-based security, such as those known in the art, to provide different users with different levels of access and different interfaces, functionality, and platforms, depending upon the security clearance associated with their user name and password. The interface 92 is provided with information and functionality commensurate with the security clearance associated with the user name and password provided. The server 46 may present different users with different interfaces, having different information and functionality, depending upon each user's role-based security clearance.

Figure 2:
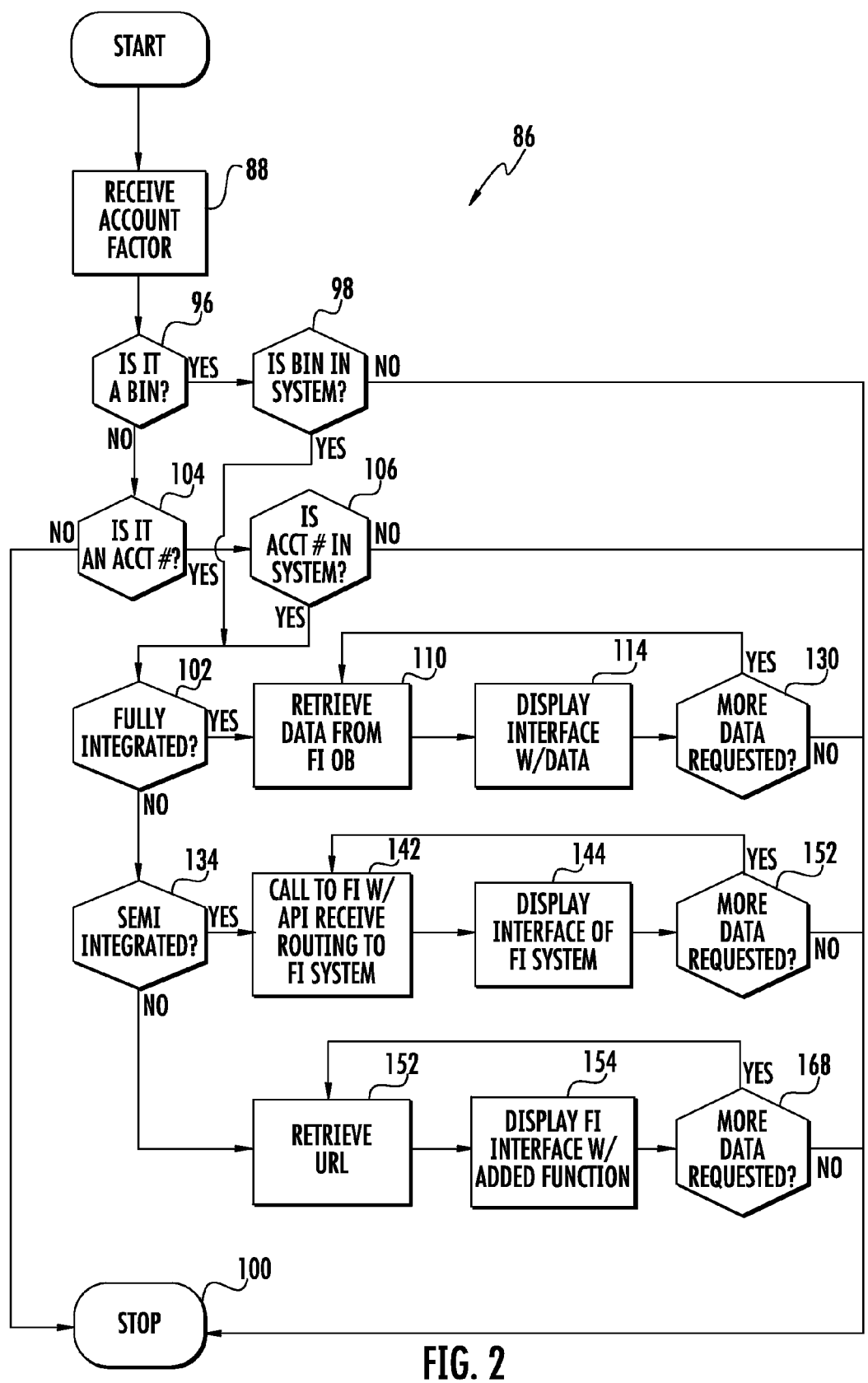
FIG. 2 illustrates a flow diagram of a method for displaying an interface using a multi-platform financial system interface.

FIG. 2 is a flow diagram of a method 86 for displaying an interface 92 associated with a multiplatform system according to an example embodiment. At step 88, after a start step, an account factor 90 is received by the server 46. The account factor 90 may be a bank identification number (BIN), an account number, or any identifier known in the art to be associated with a financial account. The financial account may be associated with a credit card, a debit card, an ATM card, a prepaid card, and/or any other type of financial account known in the art. The account factor 90 is received by the server 46 by a user directing a browser 58 of a client device 56 to a predetermined uniform resource locator (URL). The browser 58 displays the multiplatform financial system interface 92 on the display 60.

Figure 3:
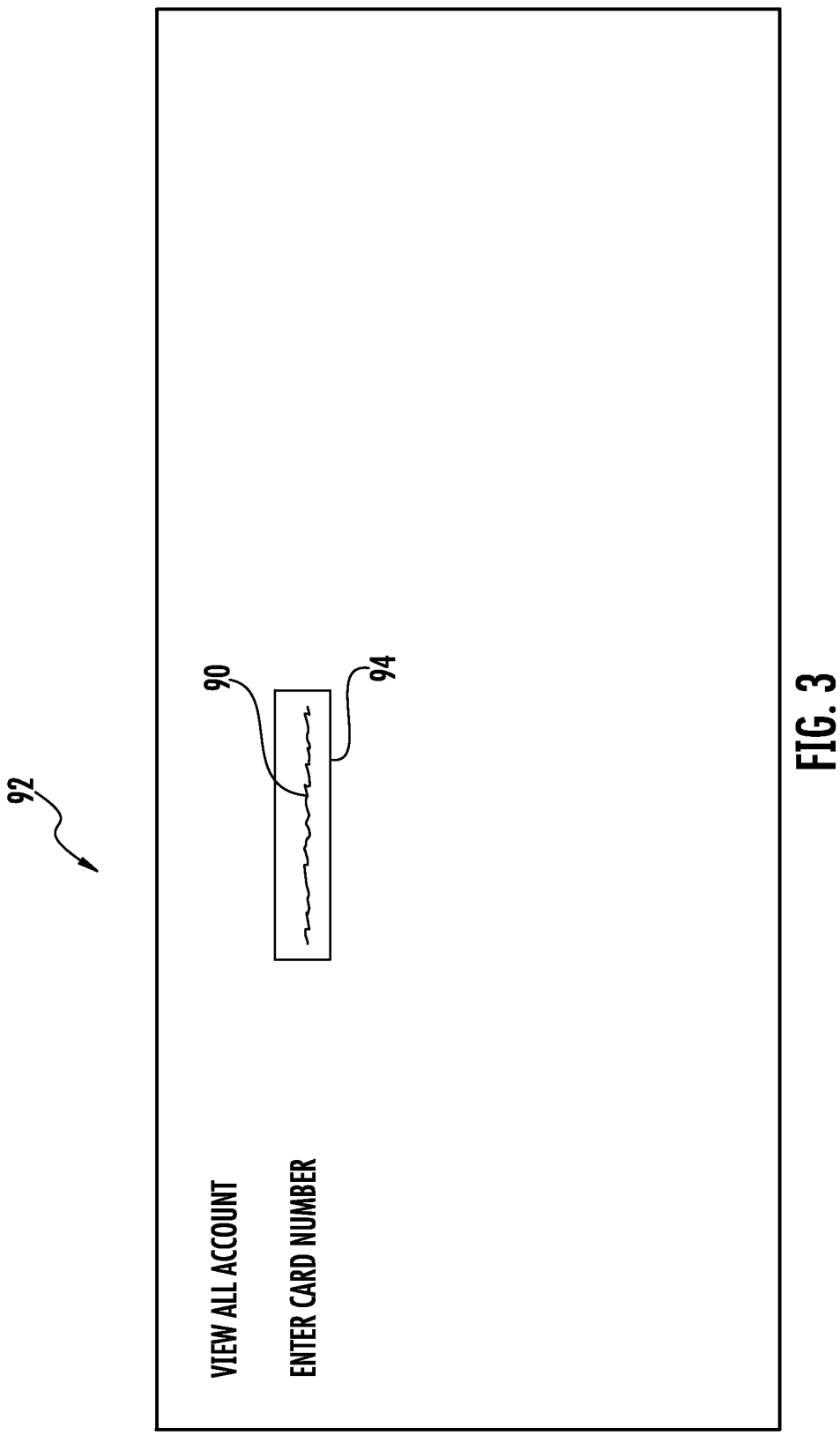
FIG. 3 illustrates an exemplary implementation of a web-based interface.

As shown in FIG. 3, the interface 92 includes a field box 94 into which a user enters the account factor 90, which, in a preferred embodiment, is an account number. Once the user enters the account factor 90 into the field box 94, the client device 56 sends the account factor 90 to the server 46, either directly or via the network 20.

Once the server 46 receives the account factor 90, the system determines 96 whether the account factor is a BIN. If the account factor 90 is a BIN, the system 10 determines 98 whether the BIN is in the database 48. If the BIN is not found to be in the database 48, the system moves to step 100 where the process terminates and an error message (not shown) is returned to the user.

If the system 10 determines 96 that the account factor is not a BIN, the process moves to step 104, where the system 10 determines 104 whether the account factor 90 is a financial account number. If the system 10 determines the account factor 90 is not a financial account number, the process moves to step 100 and terminates with an error message that the account factor 90 is not recognized.

While the embodiment described determines whether the account factor 90 is a bank identification number or a financial account number, the process can be provided with additional steps to determine if the account factor 90 is any desired format known in the art. If the system determines 104 that the account factor 90 is a financial account number, the process moves to step 106, where the system 10 determines 106 whether the account factor 90 is stored in the database 48. If the system 10 determines 106 that the account factor 90 is in the database 48, the system 10 moves to step 102.

Once the system 10 has determined that the account factor 90 is in the database 48, the system determines whether the account factor 90 is associated with a financial account platform that is fully integrated, semi integrated, or not integrated with the system 10. A fully integrated system is a system in which the server 46 is granted full access to the information associated with the financial account. The server 46 is provided with an API request server 108 that may correspond to one or more dynamic link libraries (DLL) or other libraries that comprise standardized functions for communicating with the server 18 associated with a financial institution 16. The API request server 108 allows the server 46 to access information associated with the database 12 by calling API's to execute operations on the server 18, such as returning financial account information. Alternatively, the server 46 may be provided with a frequently updated copy of the information associated with the financial account located in the database 48 associated with the server 46.

If the system 10 determines 102 that the account factor 90 is associated with a fully-integrated financial account, the process moves to step 110 where the API request server 108 of the server 46 sends an API request to the server 18 associated with a financial institution 16 for account information. The server 18 is also provided with an API request server 112 that receives the API request and calls the appropriate API to determine if the server 46 is authorized to obtain the requested information. Once the request server 112 determines that the server is authorized to obtain the requested information, the API request server 112 gathers the requested information from the database 12 and returns the authorized information back to the server 46 via the network 20. Once the system has retrieved 110 the data from the database 14, the system displays 114 the data on the display 60.

Figure 4:
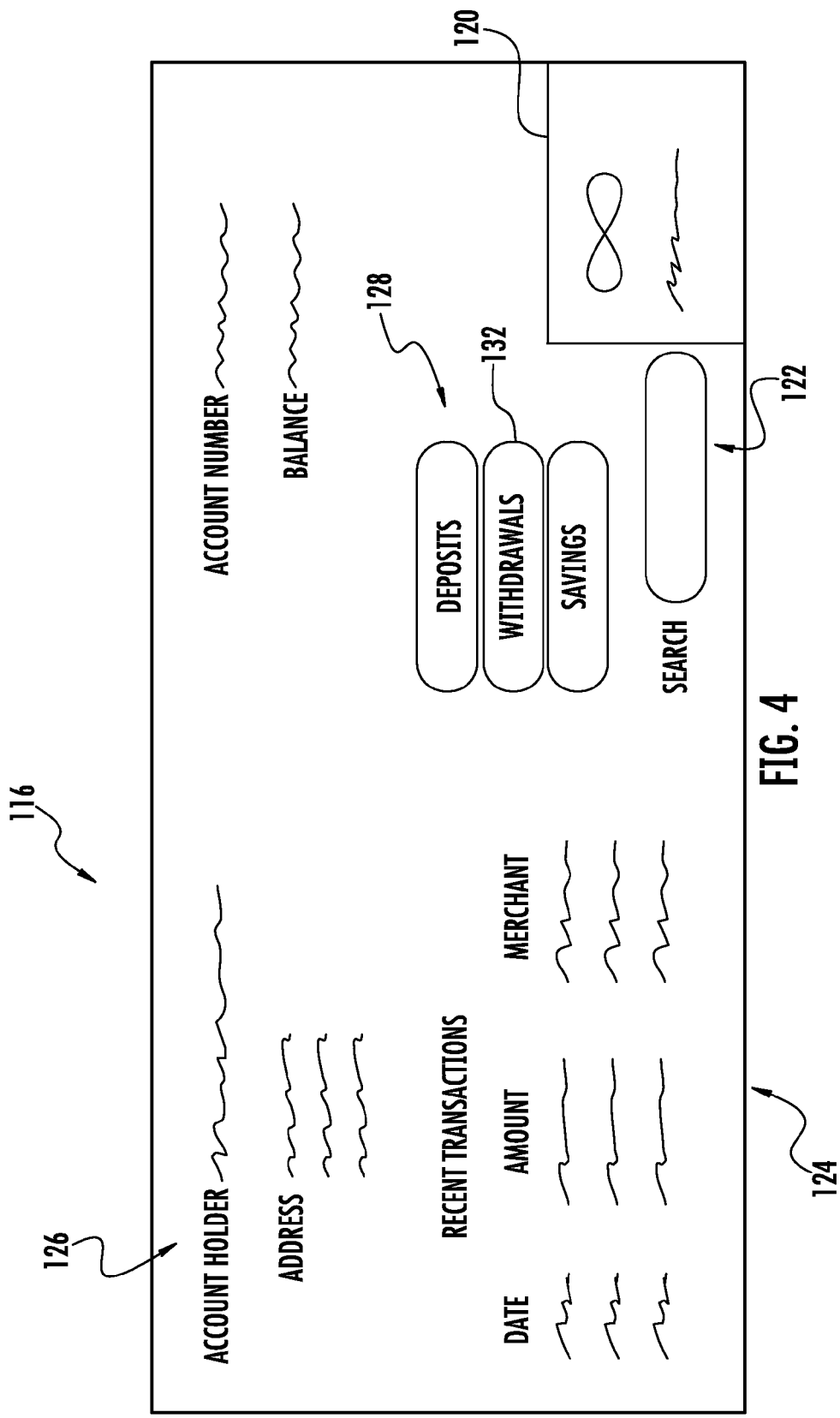
FIG. 4 illustrates a screen shot of a financial institution interface.
Figure 5:
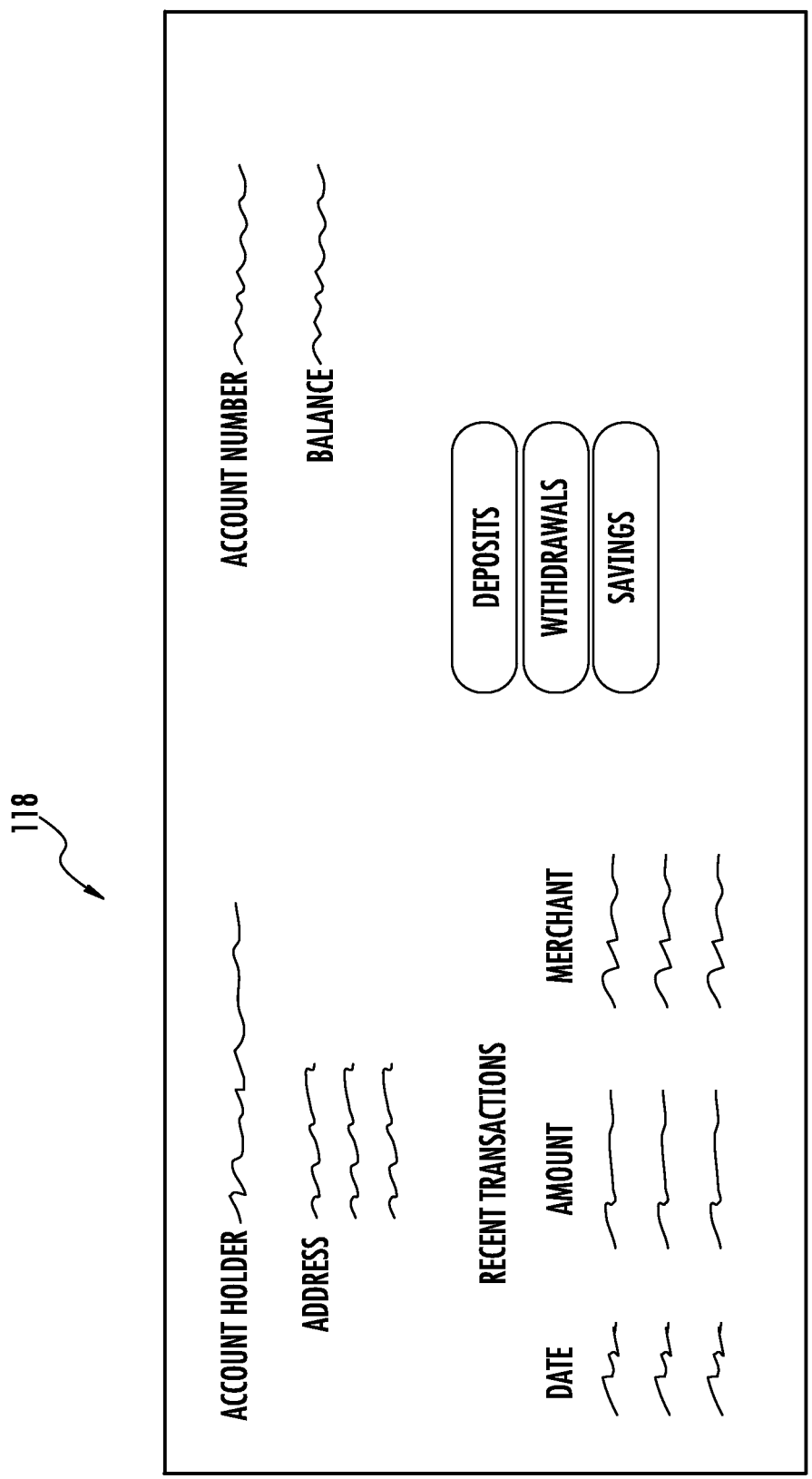
FIG. 5 illustrates a screen shot of an imitation of the financial institution interface.

As shown in FIG. 4, the information is displayed on an a webpage that imitates the look and feel of an interface 118 a user would see if the user accessed the server 18 associated with the financial institution 16 directly. Although various financial institutions use various platforms to display interfaces in various formats, the system 10 of the present invention uses the account factor 90 to automatically determine the interface and/or platform associated with the financial institution associated with the account factor 90. The system 10 then imitates that interface 118 and displays an imitation 116 of that interface 118 on the display 60. The imitation 116 may either be an exact replica of the financial institution interface 118 or may be provided with branding 120 or additional functionality, such as a search field 122, or other functionality known in the art. The imitation 116 is designed to mimic the financial institution 118 so that a user accustomed to the look and feel of the financial institution interface 118 accessed via direct communication with the financial institution 16 will be familiar with the layout 124, account data 126, and functionality 128 presented on the imitation 116.

Once the imitation 116 has been displayed, the system 10 determines 130 if any additional data is requested. If the user requests 130 additional data, such as by selecting one of the function buttons 132, the process returns to step 110 where the API request server 108 sends the appropriate request to the API request server 112 associated with the server 18. The API request server 112 retrieves the requested data from the database 14 associated with the financial institution 16. The system 10 then displays the additional information on the display 60 and determines 130 if any additional data is requested. Once no additional data is requested, the process moves to step 100 and terminates.

If the system 10 determines 102 that the financial institution 30 associated with the account factor 90 is not fully integrated, the process moves to step 134 where the system 10 determines whether the financial institution 30 associated with the account factor 90 is semi-integrated. A semi-integrated system is a system in which the server 46 is granted limited access to the information associated with the financial account. The API request server 108 of the server 46 corresponds with one or more dynamic link libraries (DLL) or other libraries that comprise standardized functions for communicating with the server 36 associated with the semi-integrated financial institution 30. Instead of returning all of the requested information to the server 46, the server 36 associated with the semi-integrated financial institution 30 returns URL hyperlinks to webpages stored on the server 36. The webpages allow the user to directly input account information and receive information from the database 138 of the server 36 associated with the semi-integrated financial institution 30 without necessarily having the information flow unencrypted through the server 46.

For a financial institution 30, which is semi-integrated with the system 10, the server 46 uses the API request server 108 to send an API request to an API request server 136 associated with the server 36 associated with a financial institution 30. As the data 32 and the database 34 associated with the financial institution 30 is not fully integrated with the system, the API request server 136 associated with the server 36 returns URL links to the API request server 108 associated with the server 46. These URLs are associated with a database 138 containing the financial institution platform and interface protocols, as well as the financial account data, which may be directly retrieved by the user.

Figure 6:
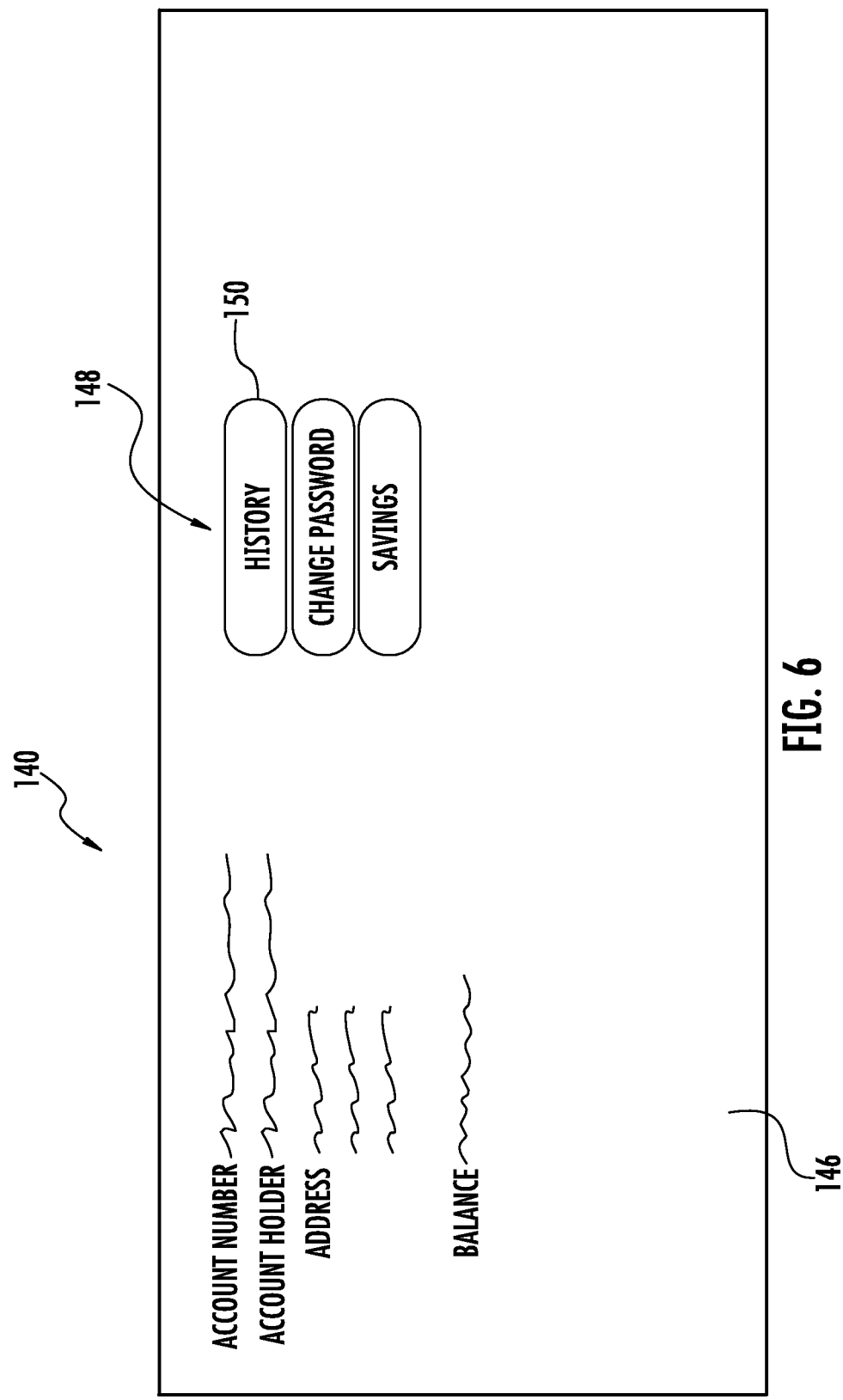
FIG. 6 illustrates a screen shot of an imitation of an additional financial institution.

As shown in FIG. 6, in the case of the user accessing a semi-integrated financial institution 30, the server 36 provides the client device 62 requesting the financial information with the interface 140. The interface 140 is received directly from the financial institution 30. The interface 140 may be the exact interface a user would see if communicating directly with the financial institution 30 or, preferably, the interface 140 is an imitation of the interface a user would see if communicating directly with the financial institution 30. Unlike the imitation 116, the interface 140 is not created by the server 46, but is instead generated by server 36 associated with the financial institution 30. A specific portion of the server 36 is dedicated to handling requests from the server 46 and presenting interfaces 140 and account information to the user in response thereto. This process allows the financial institution 30 to limit transmission of unencrypted financial data through the third party server 46 while allowing the user access to the financial data contained within the database 34, all while using the server 46 and a platform and interface the user may be familiar with through direct access to the financial institution 30 through the server 36.

If the system determines the account factor 90 is associated with the financial institution 30 semi-integrated with the system 10, the process moves to step 142, where the API request server 108 associated with the server 106 sends and API request to the API request server 136 associated with the server 36 to receive URL routing information stored in the database 34 associated with the financial institution 30. The server 46 receives this routing information and displays the interface 140 on the webpage associated with the URL. The interface 140 includes the financial data associated with the account and functionality 148 similar to the functionality associated with the interface associated with a direct connection to the server 36. If a user wishes to interact with the interface 140, the user may request 152 additional information by selecting one of the function buttons 150 that sends the request directly to the server 36. The server 36 retrieves a URL associated with a webpage having the requested data displayed on an interface similar to the interface that the user would see by connecting directly to the server 36. The server then returns the URL of the interface webpage to the client device 62, which displays the webpage with the requested information on the display 66. If the user does not request 152 any additional information, the process moves to step 100 and terminates.

If the system determines 134 that the financial institution associated with the account factor 90 is not semi-integrated with the system 10, the system 10 contacts the server 68 associated with the non-integrated financial institution 70 associated with the account factor. A non-integrated system is a system in which the server 46 is not granted access to the information associated with the financial account. The server 46 merely redirects the user directly to the server 68 associated with the financial institution 70, and the server 68 interacts with the user just as if the user was communicating directly with the financial institution 70, returning the same interface to the user that other similarly situated users communicating directly with the server 68 would receive.

Figure 7:
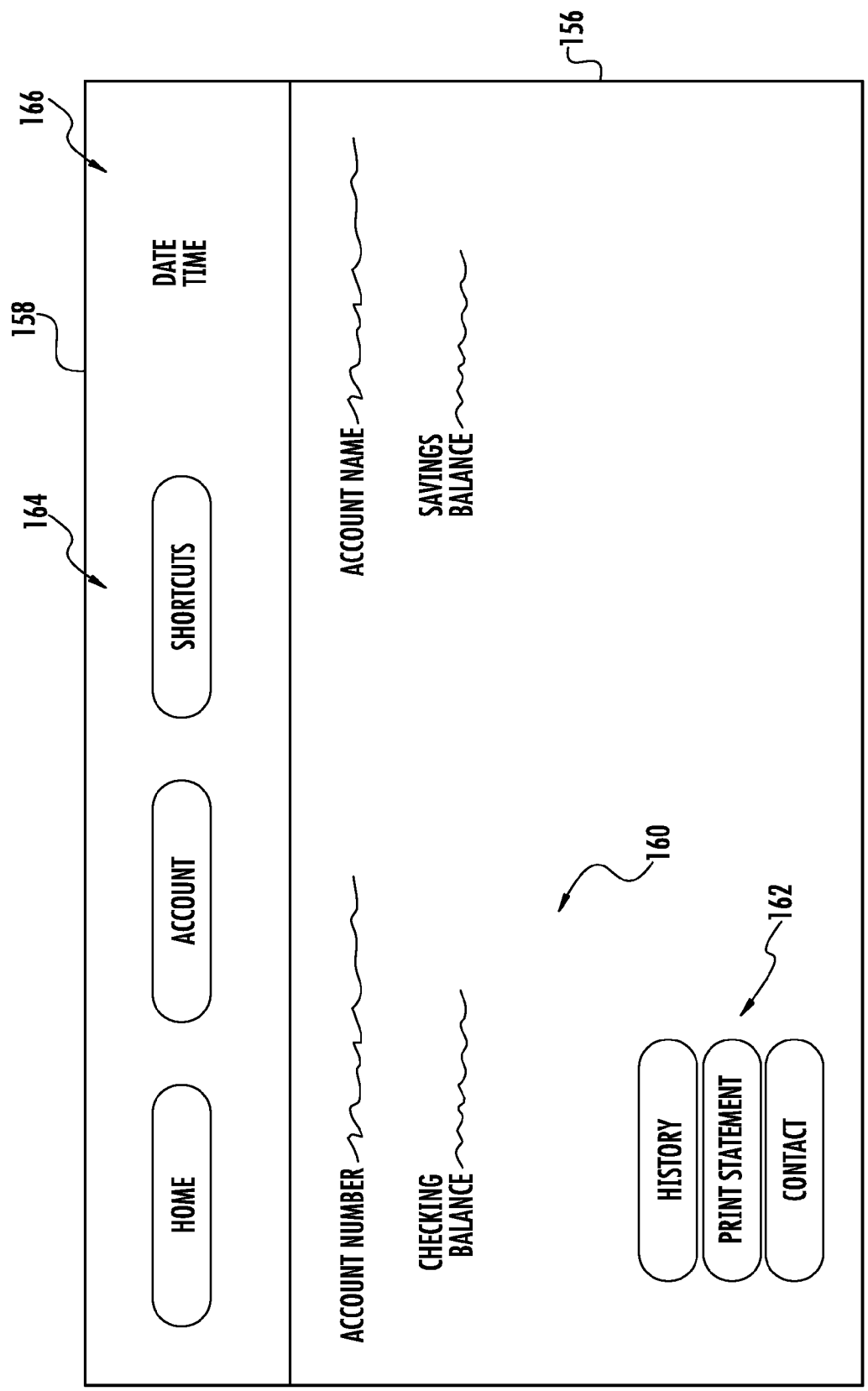
FIG. 7 illustrates a screen shot of a framed interface of a non-integrated financial institution.

If the system determines 134 that the financial institution is not integrated with the system 10, the system 10 contacts the server 68 associated with the non-integrated financial institution 70. The server 68 accesses the database 72 and returns a URL associated with the account platform and interface used by the financial institution 70. Once the system 10 has retrieved 152 the URL, the server 46 forwards the URL to the client device 50, which displays 154 the interface 156 on the display 54. The interface 156 displays the account data 160 and account functionality 162 associated with the financial institution 70. As shown in FIG. 7, in addition to the interface 156, the server 46 causes the client device 50 to also preferably display a frame 158. The frame 158 displays additional functionality 164 and data 166 associated with the system 10. The frame 158 may include any combination of functionality and data and may be integrated with the interface 156 in any manner known in the art. If additional data is requested 168, the user selects functionality 162 or 164 provided on the interface 156, and the process returns to step 152, where the server 46 again requests a new URL from the financial institution 70. The server 46 thereafter causes the client device 50 to display the new information on the interface 156 and frame in a manner such as that discussed above. If no additional data is requested 168, the process moves to step 100 and terminates.

Although the invention has been described with respect to a preferred embodiment thereof, it is to be understood that it is not to be so limited, since changes or modifications can be made therein, which are within the full intended scope of this invention as defined by the appended claims. For example, multiple platforms, each having multiple interfaces, may be associated with a single financial institution.

Additionally, client devices 74 and 80 may access the server 46 through the network 20, as opposed to a direct connection.

What is claimed is:

1. A computer-implemented method for allowing multiple users, using multiple account servers and multiple interfaces, access to multiple financial accounts, performed on one or more computing devices, the method comprising:
   (a) receiving, using the one or more computing devices, a first account factor associated with a first financial account;
   (b) receiving, using the one or more computing devices, from a first account server a first set of information associated with the first financial account;
   (c) wherein the first financial account is associated with a first financial institution;
   (d) wherein the first financial institution is associated with the first account server;
   (e) wherein the first account server is associated with a first interface;
   (f) propagating, using the one or more computing devices, a third interface with the first set of information, wherein the third interface is an imitation of the first interface;
   (g) displaying, using the one or more computing devices, the third interface on the display, propagated with the first set of information;
   (h) receiving, using the one or more computing devices, through the one or more computing devices, a second account factor associated with a second financial account;
   (i) receiving, using the one or more computing devices, from a second account server a second set of information associated with the second financial account;
   (j) wherein the second financial account is associated with a second financial institution;
   (k) wherein the second financial institution is associated with the second account server;
   (l) wherein the second account server is associated with a second interface;
   (m) propagating, using the one or more computing devices, a fourth interface with the second set of information, wherein the fourth interface is an imitation of the second interface; and
   (n) displaying, using the one or more computing devices, the fourth interface on the display, propagated with the second set of information.

2. The computer-implemented method of claim 1, wherein the first interface appears differently than the third interface.

3. The computer-implemented method of claim 1, wherein the first interface appears the same as the third interface.

4. The computer-implemented method of claim 1, wherein the first financial account is associated with a debit card.

5. The computer-implemented method of claim 4, wherein the second financial account is associated with an automated teller machine card.

6. The computer-implemented method of claim 4, wherein the second financial account is associated with a credit card.

7. The computer-implemented method of claim 1, wherein the first financial account is associated with a prepaid card.

8. The computer-implemented method of claim 1, wherein the first financial account is associated with a credit card.

9. The computer-implemented method of claim 1, wherein funds associated with the first financial account are not comingled with funds associated with the second financial account.

10. The computer-implemented method of claim 1, wherein the first financial account is not associated with the second financial institution.

11. The computer-implemented method of claim 10, wherein the second financial account is not associated with the first financial institution.

12. The computer-implemented method of claim 1, wherein funds associated with the first financial account are not comingled with funds associated with the second financial account.

13. The computer-implemented method of claim 1, wherein the first financial account is not associated with the second financial institution.

14. A computer-implemented method for allowing multiple users, using multiple account servers and multiple interfaces, access to multiple financial accounts, performed on one or more computing devices, the method comprising:
    (a) receiving, using the one or more computing devices, a first account factor associated with a first account serve;
    (b) wherein the first account factor is associated with a first financial account;
    (c) wherein the first financial account is associated with a first financial institution;
    (d) wherein the first financial institution is associated with the first account server;
    (e) wherein the first account server is associated with a first interface;
    (f) associating, using the one or more computing devices, in a database the first account factor with a first address of the location, of information associated with the first financial account;
    (g) transmitting, using the one or more computing devices, to the first address, a request for a first set of information associated with the first financial account;
    (h) receiving, using the one or more computing devices, the first set of information associated with the first financial account;
    (i) propagating, using the one or more computing devices, a third interface with the first set of information, wherein the third interface is an imitation of the first interface;
    (j) displaying, using the one or more computing devices, on, the display the third interface propagated with the first set of information;
    (k) receiving, using the one or more computing devices, through the one or more computing devices, a second account factor associated with a second account server;
    (l) wherein the second account factor is associated with a second financial account;
    (m) wherein the second financial account is associated with a second financial institution;
    (n) wherein the second financial institution is associated with the second account server;
    (o) wherein the second account server is associated with a second interface;
    (p) associating, using, the one or more computing devices, in the database the second account factor with a second address of the location of information associated with the second financial account;

(q) transmitting, using the one or more computing devices, to the second address, a request for a second set of information associated with the second financial account;
(r) receiving, using the one or more computing devices, the second set of information associated with the second financial account;
(s) propagating, using the one or more computing devices, a fourth interface with the second set of information, wherein the fourth interface is an imitation of the second interface; and
(t) displaying, using the one or more computing devices, on the display the fourth interface propagated with the second set of information.

15. The computer-implemented method of claim 14, wherein the first financial account is associated with a debit card.

16. The computer-implemented method of claim 14, wherein the second financial account is associated with an automated teller machine card.

17. The computer-implemented method of claim 14, wherein the first interface appears differently than the third interface.

18. The computer-implemented method of claim 14, wherein the first interface appears the same as the third interface.

19. A system comprising:
(a) a first financial account associated with a first financial institution;
(b) a second financial account associated with a second financial institution;
(c) a first account server associated with the first financial institution;
(d) a second account server associated with the second financial institution;
(e) a first interface associated with the first account server;
(f) a second interface associated with the second account server;
(g) a display;
(h) one or more computers; and
(i) a computer-readable medium coupled to the one or more computers having a non-transitory computer-readable program code encoded thereon which, when executed by the one or more computers, cause the one or more computers to perform operations comprising:
  (i) determining a first financial account using a first account factor;
  (ii) determining a second financial account using a second account factor;
  (iii) receiving from the first financial institution a first set of information associated with the first financial account;
  (iv) propagating a third interface with the first set of information, wherein the third interface is an imitation of the first interface;
  (v) displaying on the display the third interface propagated with the first set of information;
  (vi) receiving from the second financial institution a second set of information associated with the second financial account;
  (vii) propagating a fourth interface with the second set of information, wherein the fourth interface is an imitation of the second interface;
  (viii) displaying on the display the fourth interface propagated with the second set of information.

20. The computer-implemented method of claim 19, wherein funds associated with the first financial account are not comingled with funds associated with the second financial account.

* * * * *

UNITED STATES PATENT AND TRADEMARK OFFICE
CERTIFICATE OF CORRECTION

| | | |
|---|---|---|
| PATENT NO. | : 9,454,784 B2 | Page 1 of 1 |
| APPLICATION NO. | : 14/102034 | |
| DATED | : September 27, 2016 | |
| INVENTOR(S) | : Todd D. Herren | |

It is certified that error appears in the above-identified patent and that said Letters Patent is hereby corrected as shown below:

In the Claims

In column 8, line 26, please delete "serve" and insert therefor --server--.

Signed and Sealed this
Twenty-second Day of November, 2016

Michelle K. Lee
*Director of the United States Patent and Trademark Office*